United States Patent [19]

Um

[11] Patent Number: 5,572,876
[45] Date of Patent: Nov. 12, 1996

[54] OPERATIONAL CONTROL METHOD AND APPARATUS FOR AN AIR CONDITIONER

[75] Inventor: Kyung-Yong Um, Suwon, Rep. of Korea

[73] Assignee: Samsung Electronics Co., Ltd., Suwon, Rep. of Korea

[21] Appl. No.: 495,793

[22] Filed: Jun. 27, 1995

[30] Foreign Application Priority Data

Jun. 27, 1994 [KR] Rep. of Korea .................... 94-14891

[51] Int. Cl.⁶ ................. F25D 17/06; F25B 1/00
[52] U.S. Cl. .................... 62/89; 62/179; 62/181
[58] Field of Search .............................. 62/179, 181, 229

[56] References Cited

U.S. PATENT DOCUMENTS 5,255,529 10/1993 Powell et al. ........................ 62/181 X
5,400,611 3/1995 Takeda et al. ....................... 62/181 X Primary Examiner—William E. Wayner
Attorney, Agent, or Firm—Burns, Doane, Swecker & Mathis, L.L.P.

[57] ABSTRACT

The present invention relates to an operational control method and apparatus for an air conditioner in which a rotary speed of an outdoor fan motor is controlled according to a rotary speed of an indoor fan motor, to thereby perform cooling or heating operations thereof. The apparatus includes a zero voltage detector for detecting a zero potential of a commercial alternating current voltage, a controller for controlling an overall operation by being synchronized with the zero potential of the commercial alternating current voltage detected by the zero voltage detector, an indoor fan motor driver for driving an indoor fan motor according to control of the controller, an indoor fan speed detector for detecting a rotary speed of the indoor fan motor driven by the indoor fan motor driver, an outdoor fan motor driver for driving an outdoor fan motor according to control of the controller, and an outdoor fan speed detector for detecting a rotary speed of the outdoor fan motor driven by the outdoor fan motor driver.

11 Claims, 5 Drawing Sheets

OPERATIONAL CONTROL METHOD AND APPARATUS FOR AN AIR CONDITIONER

BACKGROUND

1. Field of the Invention

The present invention relates to an operational control apparatus of an air conditioner and a method thereof by which rotary speed of an outdoor fan motor can be controlled according to rotary speed of an indoor fan motor to thereby perform cooling and/or heating operations.

2. Description of the Related Art

Generally, in a conventional air conditioner, when a user establishes a desired temperature and turns on an operational switch, an indoor fan is driven according to a control of control means 5 and an indoor temperature changing at this time is detected by indoor temperature detecting means.

At this time, the indoor temperature data detected by the indoor temperature detecting means is received by the control means 5 and compared with the desired temperature data the user has established.

According to a result of the comparison therefrom, the control means 5 serves to determine an operational frequency of a compressor according to a difference between an indoor temperature and the established temperature, thereby driving the compressor.

By way of example, the compressor is driven when the indoor temperature is lower than the established temperature in a heating operation of the air conditioner, while the compressor is stopped of operation when the indoor temperature is above the established temperature, to thereby perform an indoor heating operation.

Meanwhile, the compressor is driven when the indoor temperature is above the established temperature in a cooling operation of the air conditioner, whereby the compressor is stopped of operation when the indoor temperature is below the established temperature, thereby performing an indoor cooling operation.

As noted in the above, the control means 5 serves to output a motor driving signal of high level to outdoor fan motor driving means 7 for driving an outdoor fan motor 9 through an output terminal according to the difference between the indoor temperature and the established temperature when the compressor is being driven.

Accordingly, a control signal of high level output from an output terminal 01 of the control means 5 is reversed at the outdoor fan motor driving means 7 to a signal of low level by an inverter INV1, to thereby be applied to an exciting coil RL of a relay RY.

Thereafter, a movable contact SW of the relay RY is turned on, to thereby cause a power supply voltage of commercial alternating current supplied from an alternating current power source input terminal 1 to be applied to an outdoor fan motor 9, so that the outdoor fan motor 9 can start rotating at a maximum speed.

However, in the conventional operating method thus described, the outdoor fan motor is driven only according to the difference between the indoor temperature and the established temperature regardless of heat exchange amount, in other words, regardless of change in indoor airflow discharge amount against the rotary speed of the indoor fan motor established by the user, so that the rotary speed of the outdoor fan motor cannot be variably controlled.

Therefore, there is a problem in that cooling efficiency can be decreased due to an overload state of the outdoor fan motor at a low level stage of the indoor airflow discharge amount during the heating operation, and temperature of the air discharged from an indoor unit can be lowered at a high level stage of the indoor airflow discharge amount to thereby prevent a pleasant indoor environment from being maintained.

Furthermore, there is another problem in that the cooling efficiency can be reduced by the front forming at an indoor heat exchanger due to overload of the outdoor fan motor at the low level stage of the indoor airflow discharge amount during the cooling operation, and the temperature of the air discharged from the indoor unit can be increased at the high level stage of the indoor airflow discharge to thereby prevent the pleasant indoor environment from being maintained.

SUMMARY

Accordingly, the present invention has been disclosed to solve the aforesaid problems and it is an object of the present invention to provide an operational control apparatus of an air conditioner and a method thereof by which a rotary speed of an outdoor fan motor can be controlled according to a rotary speed of an indoor fan motor with regard to an indoor airflow discharge amount selected by the user, thereby providing a pleasant indoor environment and at the same time, increasing cooling and heat efficiencies.

In accordance with one aspect of the present invention, there is provided an operational control apparatus of an air conditioner, the apparatus comprising:

zero voltage detecting means for detecting zero voltage of a commercial alternating current AC voltage input from an AC power source input terminal;

control means for being synchronized with the zero voltage of the commercial AC voltage detected by the zero voltage detecting means to thereby control an overall operation of the air conditioner;

indoor fan motor driving means for receiving a control signal output from the control means to thereby drive an indoor fan motor according to the indoor airflow discharge amount selected by the user so that heat exchanged air can be flowed indoors;

indoor fan speed detecting means for detecting a rotary speed of the indoor fan motor so as to discriminate whether or not revolution of the indoor fan motor driven by the indoor fan motor driving means is appropriate according to the indoor airflow discharge amount;

outdoor fan motor driving means for receiving the control signal output from the control means to thereby drive an outdoor fan motor according to the indoor airflow discharge amount selected by the user so that cooling and heating operations can be performed; and outdoor fan speed detecting means for detecting a rotary speed of the outdoor fan motor so as to discriminate whether or not revolution of the outdoor fan motor driven by the outdoor fan motor driving means is appropriate according to the indoor airflow discharge amount.

In accordance with another aspect of the present invention, there is provided an operational control method of an air conditioner, the method comprising the steps of:

detecting the rotary speed of the indoor fan motor according to the indoor airflow discharge amount selected by the user to thereby discriminate whether or not the rotary speed of the indoor fan motor is an appropriate rotary speed;

discriminating an operational condition of the outdoor fan motor according to a difference between an established temperature and an indoor temperature in case the rotary speed of the indoor fan motor discriminated by the indoor fan speed discriminating step is an appropriate rotary speed;

determining an appropriate rotary speed of the outdoor fan motor according to the indoor airflow discharge amount selected by the user in case the outdoor fan motor is in the operational condition according to the discrimination by the outdoor fan operation discriminating step;

driving the outdoor fan motor according to the rotary speed determinated by the outdoor fan speed determination step to thereby detect the rotary speed of the outdoor fan motor discriminating whether the rotary speed of the outdoor fan motor detected by the outdoor fan speed detecting step is the appropriate rotary speed determined by the outdoor fan speed discrimianting step; and driving a compressor and the outdoor fan motor according to control of the control means to thereby perform the cooling and heating operations in case the rotary speed of the outdoor fan motor discriminated by the outdoor fan speed discriminating speed is the appropriate rotary speed.

BRIEF DESCRIPTION OF THE DRAWINGS

For fuller understanding of the nature and objects of the invention, reference should be made to the following detailed descriptiion taken in conjunction with the accompanying drawings in which.

DETAILED DESCRIPTION

An embodiment of the present invention will now be described in detail with reference to the accompanying drawings.

Figure 1:
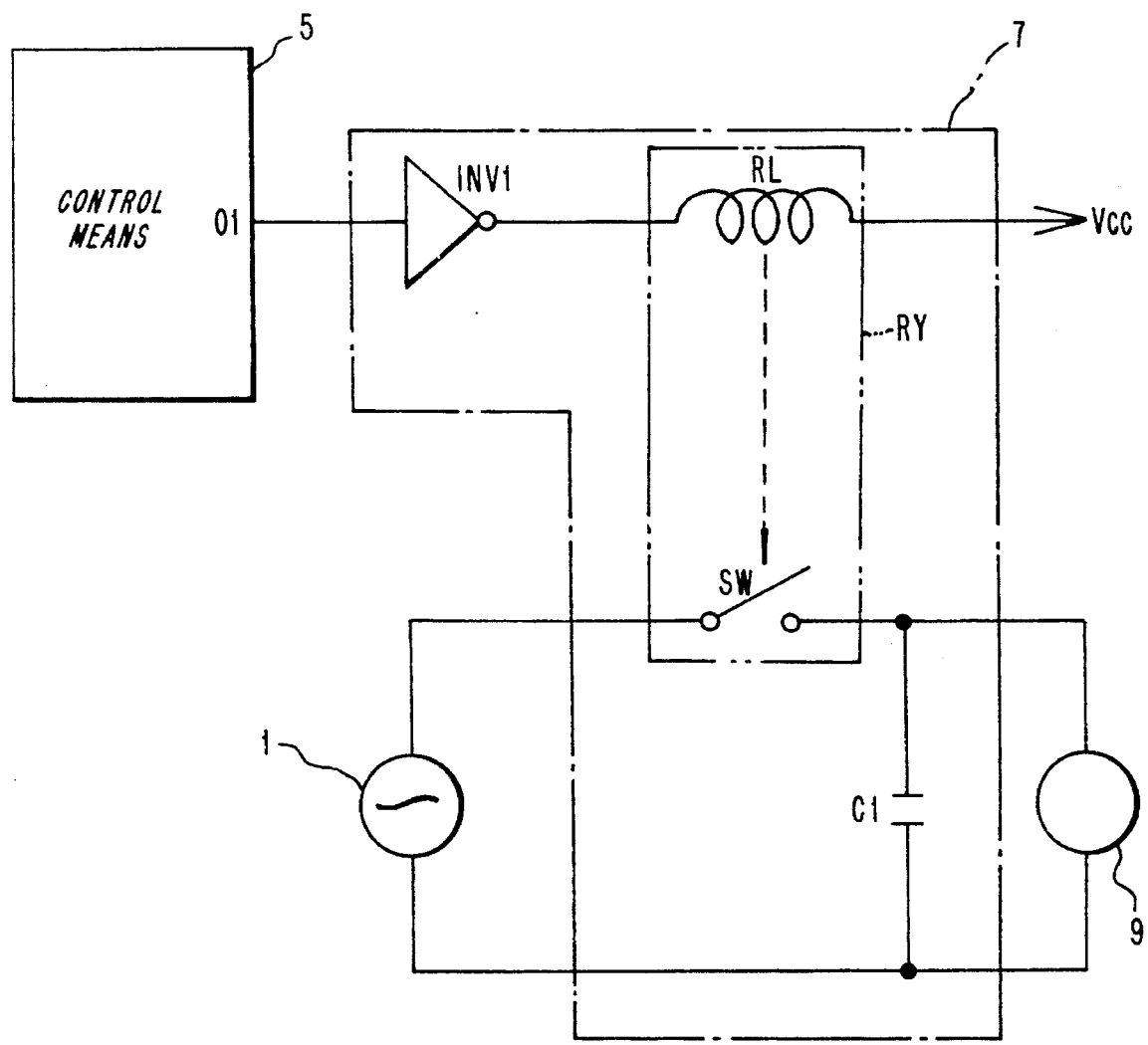
FIG. 1 is a schematic diagram for illustrating a driving circuit of an outdoor fan motor of an air conditioner according to the prior art.
Figure 2:
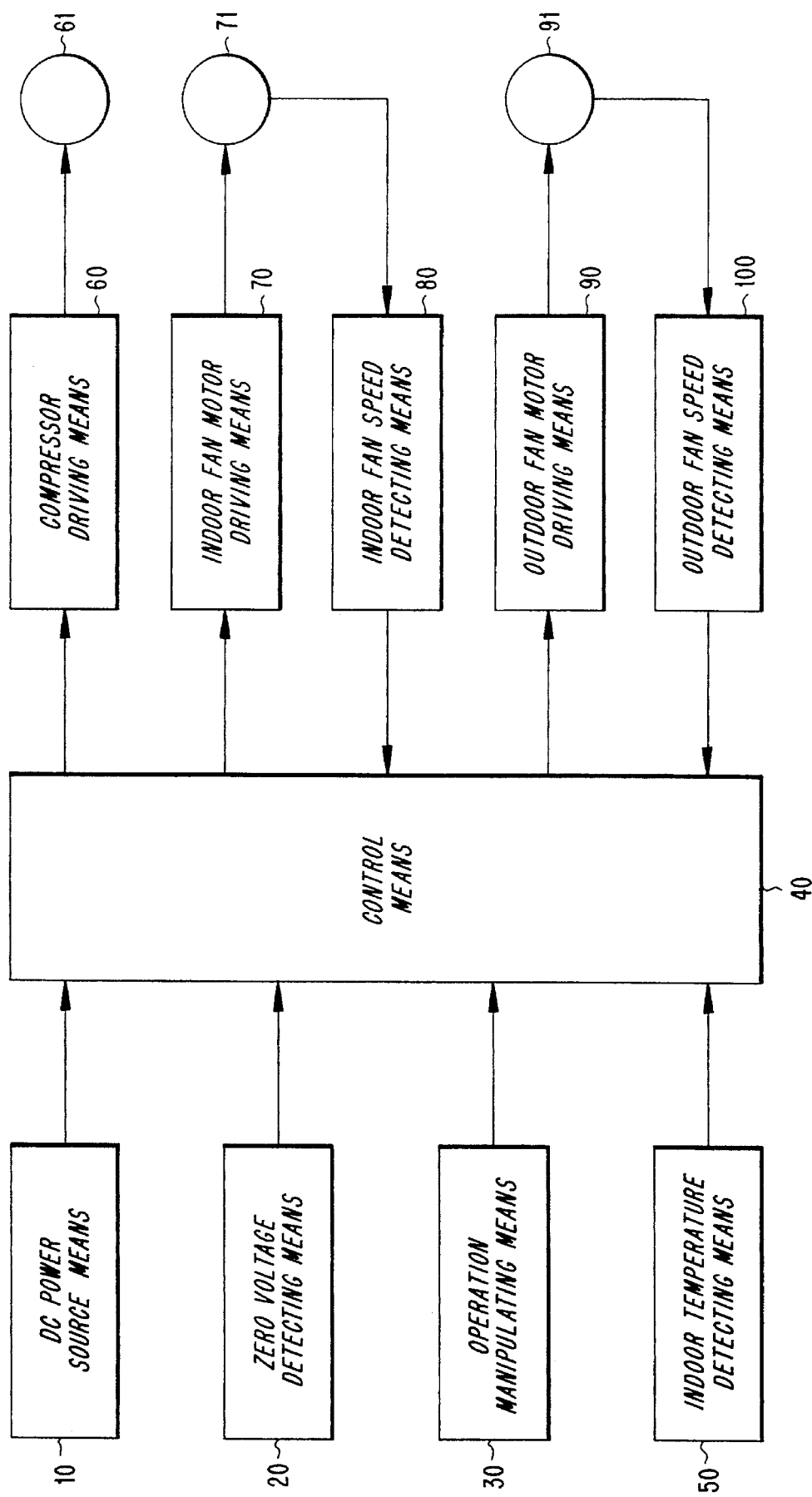
FIG. 2 is a control block diagram of an operational control apparatus of an air conditioner according to one embodiment of the present invention.
Figure 3:
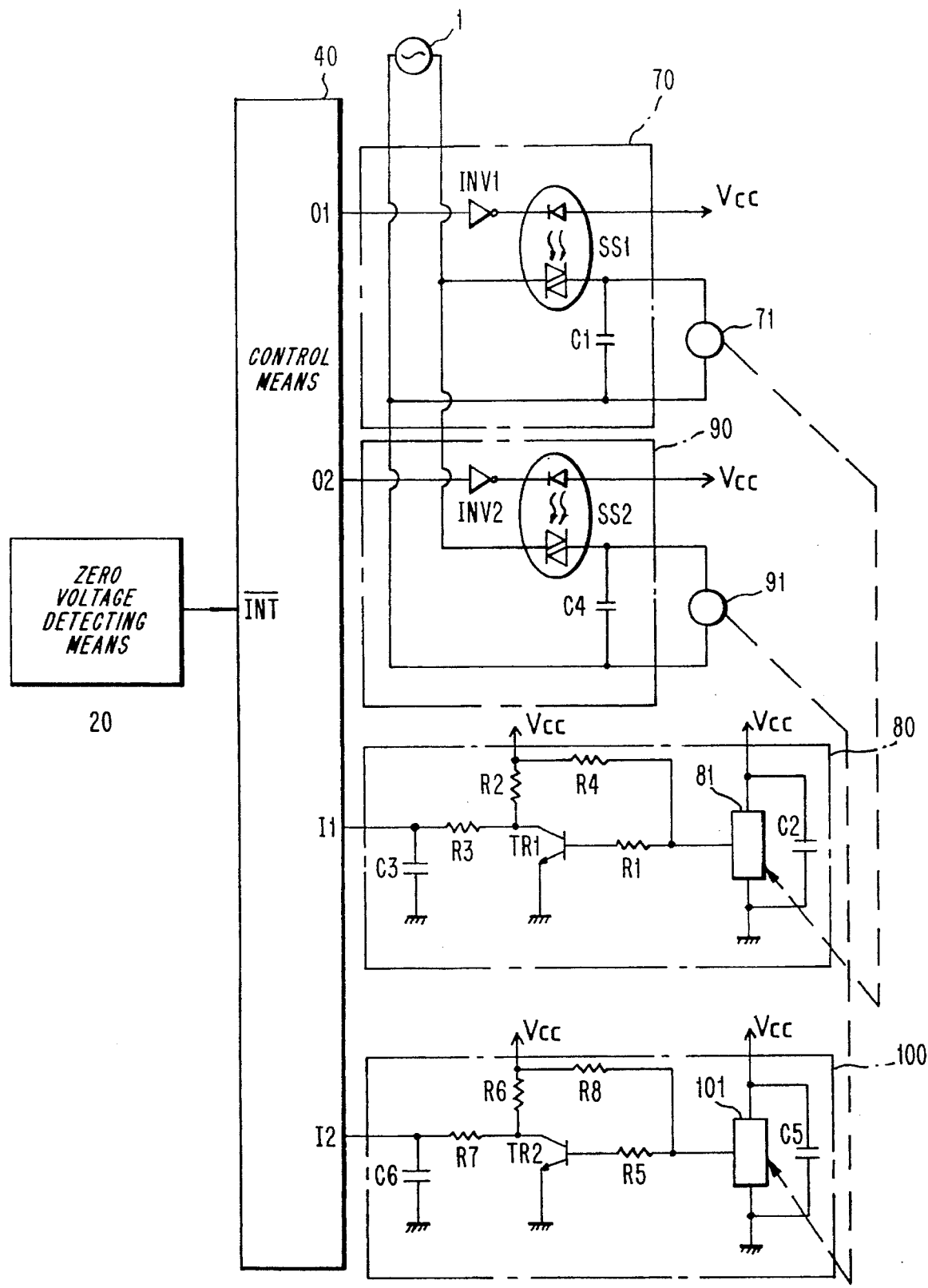
FIG. 3 is a detailed circuit diagram of principal parts according to an embodiment of the present invention.

As illustrated in FIGS. 2 and 3, direct current DC power source means 10 serves to receive a power source voltage of the commercial AC power source supplied from an AC power input terminal 1 to thereby convert the same to a predetermined DC voltage Vcc necessary for driving an air conditioner and to output the same, and zero voltage detecting means 20 serves to detect the zero voltage of the commercial AC voltage supplied from the AC power input terminal 1.

Operation manipulating means 30 is provided with a plurality of functional keys at control panels of the air conditioner and a remote controller, so that operational conditions (cooling, heating, air cleaning, defrosting or the like) of the air conditioner, established Ts and indoor airflow discharge amount desired by the user can be input.

Control means 40 is a micro computer which serves to receive a zero voltage detecting signal output from the zero voltage detecting means 20 through an input terminal INT to thereby turn on or turn off the air conditioner by being synchronized with zero potential of the commerial AC voltage, and at the same time, to control the overall cooling and heating operations of the air conditioner according to the operational conditions input by the operation manipulating means 30.

Furthermore, indoor temperature detecting means 50 serves to control an indoor temperature by temperature Ts established by the user according to the operation manipulating means 30 to detect a temperature Tr of indoor air sucked in through a suction port (not shown) and to thereby output the same to the control means 40 so that the cooling and heating operations of the air conditioner can be carried out.

Compressor driving means 60 serves to receive a control signal output from the control means 40 according to a difference between the temperature established by the user according to the operation manipulating means 30 and an indoor temeprature Tr detected by the indoor temperature detecting means 50, to thereby controllably drive a compressor 61.

Indoor fan motor driving means 70 serves to receive the control signal output from the control means 40 to controllably drive an indoor fan motor 71 so that air (cool air or warm air) heat exchanged by an indoor heat exchanger (not shown) according to discharged airflow amount established by the user with an assistance of the operation manipulating means 30 can be blown indoors, where the indoor fan motor driving means 70 includes an inverter INV1 for inverting a motor driving signal output from an output terminal 01 of the control means 40, a dyristor SS1 for being turned on or turned off to thereby cause the indoor fan motor to be driven by receiving the motor driving signal inverted by the inverter INV1 to thereby control the current of the commercial AC power source applied to the indoor fan motor 71, and a capacitor C1 for being connected in parallel to the indoor fan motor 71 by being charged or discharged with an input from the commercial AC power source supplied from the AC power source input terminal 1 to thereby generate a phase difference, so that a voltage source for driving the indoor fan motor 71 can be formed.

Indoor fan speed detecting means 80 in the drawing serves to detect revolution RPM1 of the indoor fan motor 71 driven by the indoor fan motor driving means 70 to thereby output the same to the control means 40, where the indoor fan speed detecting means 80 includes a first Hall sensor 81 for detecting a signal current changing when the indoor fan motor 71 rotates so that revolution of the indoor fan motor 71 driven by the indoor fan motor driving means 70 can be detected, a capacitor C2 for being connected in parallel to the first Hall sensor 81 so that noise component contained in the signal current detected by the Hall sensor 81 can be filtered, a transistor TR1 for being turned on or turned off in order to output a pulse signal to an input terminal I1 of the control means 40 by receiving the signal current detected by the first Hall sensor 81 through a resistor R1, Resistors R2 and R3 for being connected to a collector terminal of the transistor TR1 so that a pulse signal proportionate to the revolution RPM1 of the indoor fan motor 71 during activation or deactivation of the transistor TR1 can be output to the input terminal I1 of the control means 40, a capacitor C3 for being connected in parallel to the resistor R3 at one side thereof and for being connected to ground at the other side thereof so that the noise component contained in the pulse signal generated during the activation and deactivation of the transistor TR1 can be filtered, and a resistor R4 for being connected to a base terminal and the collector terminal of the transistor TR1 through the resistors R1 and R2 so that the current flowing in the base of the transistor TR1 can be steadily maintained.

Furthermore, outdoor fan motor driving means 90 serves to receive the control signal of the control means 40 according to a rotary speed proportionate to the revolution of the indoor fan motor 71 detected by the indoor fan speed detecting means 80 to controllably drive an outdoor fan motor 91, where the outdoor fan motor driving means 90 includes an inverter INV2 for inverting a motor driving signal output from an output terminal 02 of the control means 40, a dyristor SS2 for being turned on or turned off to thereby cause the outdoor fan motor 91 to be driven by receiving the motor driving signal inverted by the inverter INV2 to thereby control the current of the commercial AC power source applied to the outdoor fan motor 91, and a capacitor C4 for being connected in parallel to the outdoor fan motor 91 by being charged or discharged with the input of the commercial AC power source supplied from the AC power source input terminal 1 to thereby generate a phase difference, so that a voltage source for driving the outdoor fan motor 91 can be formed.

Outdoor fan speed detecting means 100 serves to detect revolution RPM2 of the outdoor fan motor 91 driven by the outdoor fan motor driving means 90 to thereby output the same to the control means 40, where the outdoor fan speed detecting means 90 includes a second Hall sensor 101 for sensing a signal current changing in the course of the rotation of the outdoor fan motor 91 so that the revolution of the outdoor fan motor 91 driven by the outdoor fan motor driving means 90 can be detected, a capacitor C5 for being connected in parallel to the second Hall sensor 101 so that noise component contained in the signal current detected by the second Hall sensor 101 can be filtered, a transistor TR2 for being turned on or turned off by receiving the signal current detected by the second Hall sensor 101 through a resistor R5 to thereby output a pulse signal to an input terminal I2 of the control means 40, resistors R6 and R7 for being connected to a collector terminal of the transistor TR2 so that a pulse signal proportionate to the revolution RPM2 of the outdoor fan motor 91 when the transistor TR2 is turned on or turned off can be output to the input terminal I2 of the control means 40, a capacitor C6 for being connected in parallel at one side thereof to the resistor R7 and for being connected at the other side thereof to ground so that the noise component contained in the pulse signal generated in the activation or deactivation of the transistor TR2, and a resistor R8 for being connected to a base terminal and a collector terminal of the transistor TR2 so that the current flowing in the base of the transistor TR2 can be steadily maintained.

Now, the operational effect of the operational control apparatus of an air conditioner and a method thereof thus constructed will be described.

Figure 4A:
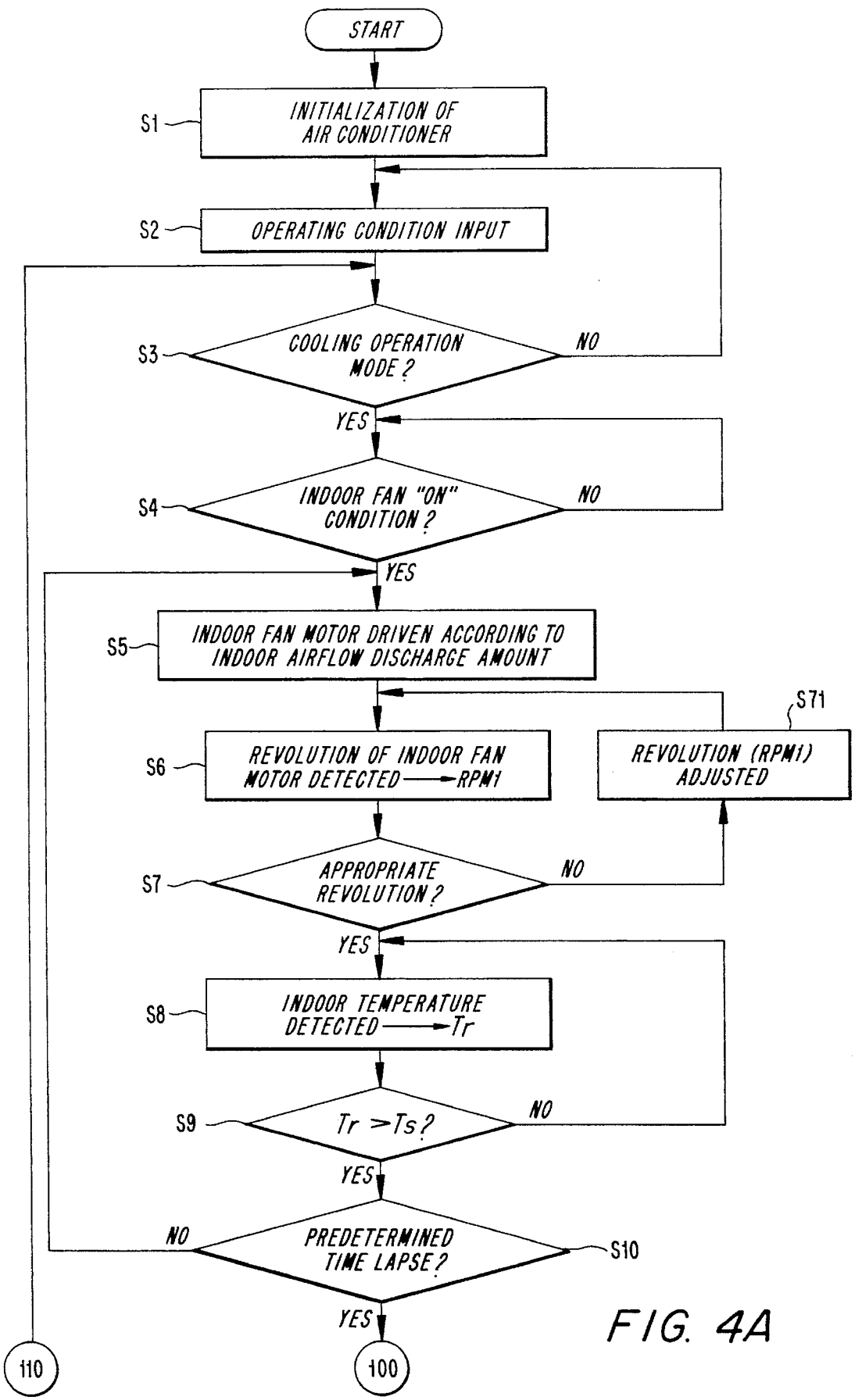
FIGS. 4A and 4B are flow charts chargs of operational procedures in operational control of the air conditioner according to an exemplary embodiment of the present invention.
Figure 4B:
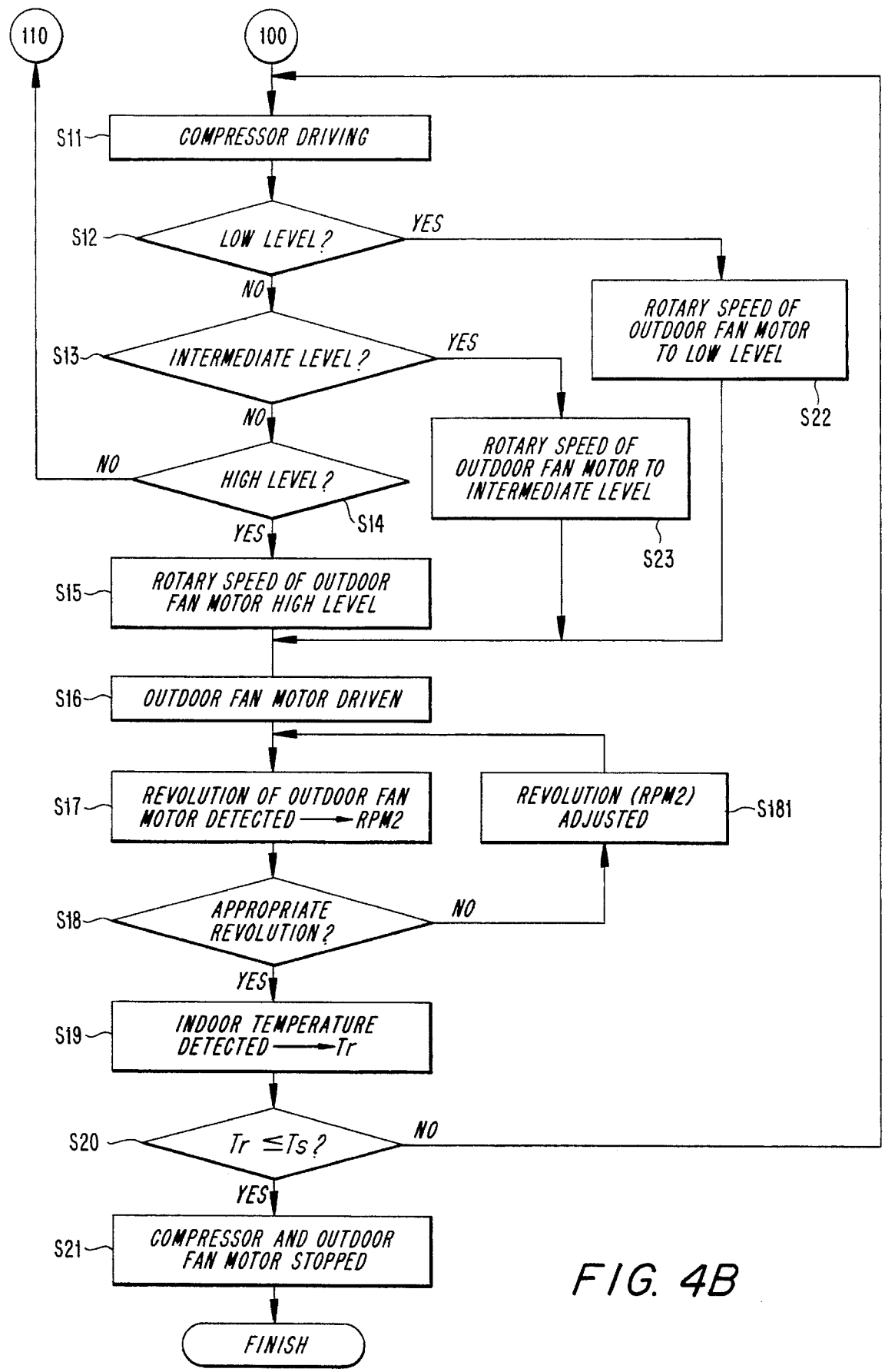

FIGS. 4A and 4B are flow charts for illustrating operational procedures in the operational control of the air conditioner according to the present invention, where reference symbol S indicates steps.

First of all, when an electric power is applied to the air conditioner, the direct current power source means 10 serves to receive a power source voltage of the commercial AC power source supplied from the AC power source input terminal 1 to thereby convert the same to a predeterined DC voltage Vcc necessary for driving the air conditioner and to output the same to respective driving circuits and the control means Meanwhile, the zero voltage detecting means 20 serves to detect the zero voltage of the commercial AC voltage supplied from the AC power source input terminal 1 to thereby output the same to the control means 40.

Accordingly, at step S1, the control means 40 serves to receive through an input terminal INT a zero voltage detecting signal output from the zero voltage detecting means 20, and at the same time, to receive a DC voltage output from the DC power source means 10 to thereby be synchronized with the zero voltage of the commercial AC voltage, so that the air conditioner can be initialized.

Next, at step S2, when the operational conditions of the air conditioner desired by the user according to the operation manipulating means 30 (cooling, heating, air cleaning, defrosting and the like), established temperature Ts and the indoor airflow discharge amount (rotary speed of the indoor fan motor) are input to the control means 40, flow proceeds to step S3, and the control means 40 discriminates whether the operational condition input by the operation manipulating means 30 is "cooling operation".

As a result of the discrimination at the step S3, if the operational condition input by the operation manipulating means 30 is not "the cooling operation" (in case of no), flow returns back to the step S2 to put the air conditioner in an operation waiting state until a cooling operation mode is input, and then performs repeated operations subsequent to the step S2.

Meanwhile, as a result of the discrimination at the step S3, if the operational condition input by the operation manipulating means 30 is "the cooling operation", (in case of yes), flow advances to step S4 for performing the cooling operation of the air conditioner to thereby discriminate whether the indoor fan motor 71 is in an "on" state, and if the indoor fan motor 71 is not in the "on" state (in case of no), flow returns back to the step S4 until the indoor fan motor 71 reaches the "on" state and performs repeated operations subsequent to the step S4.

As a result of the discrimination at the step S4, if the indoor fan motor 71 is in the "on" state (in case of yes), which implies that the indoor fan motor 71 should be driven according to the indoor airflow discharge amount input by the operation manipulating means 30, flow proceeds to step S5, where the control means 40 outputs a motor driving signal of high level to the indoor fan motor driving means 70 through an output terminal 01.

Accordingly, the indoor fan motor driving means 70 receives at the inverter INV1 the motor driving signal of high level output from the output terminal 01 in the control means 40 and inverts the same to low level to thereby apply the same to the dyristor SS1.

When the dyristor SS1 is rendered operative, the power source voltage of the commercial AC power source supplied from the AC power source input terminal 1 is applied to the indoor fan motor 71 to thereby start to rotate the indoor fan motor 71.

At step S6, when the indoor fan motor 71 is rotated, the signal current changing in the course of the rotation of the indoor fan motor 71 is detected at the first Hall sensor 81 of the indoor fan speed detecting means 80 to thereby cause a rectangular wave of high level or of low level to be generated.

Accordingly, when the rectangular wave output from the first Hall sensor 81 is applied to the base terminal of the transistor TR1 through the resistor R1, the transistor TR1 is rendered operative or inoperative to thereby cause a pulse signal of rectangular wave proportionate to the revolution RPM1 of the indoor fan motor 71 to be input to the input terminal I1 of the control means 40.

Now, at step S7, a discrimination is made as to whether the revolution RPM1 of the indoor fan motor 71 detected by the indoor fan speed detecting means 80 is an appropriate revolution rpm according to the indoor airflow discharge amount pre-established at the control means 40 by the operation manipulating means 30.

As a result of the discrimination at the step S7, if the revolution RPM1 of the indoor fan motor 71 is not the appropriate revolution rpm (in case of no), flow advances to step S7, where the control means 40 controls the motor driving signal of high level or of low level output from the output terminal 01 to thereby increase or decrease the revolution RPM1 of the indoor fan motor 71, and adjusts the same to the pre-established appropriate revolution rpm, and returns back to the step S6 to thereby perform the repeated operations subsequent to the step S6.

Meanwhile, as a result of the discrimination at the step S7, if the revolution RPM1 of the indoor fan motor 71 is the appropriate revolution rpm (in case of yes), flow proceeds to step S8, where, the temperature Tr of the indoor air sucked in through a suction port (not shown) by turning effect of the indoor fan rotated in cooperation with the drive of the indoor fan motor 71 is detected by the indoor temperature detecting means 50, to thereby be output to the control means 40.

Successively, at step S9, a discrimination is made as to whether the indoor temperature Tr detected by the indoor temperature detecting means 50 is bigger than the established temperature Ts input by the operation manipulating means 30, and if the indoor temperature Tr is not bigger than the established temperature Ts (in case of no), which implies that there is no need to perform a cooling operation of the air conditioner, flow returns to the step S8 and detects the indoor temperature Tr continuously to thereafter perform repeated operations subsequent to the step S8.

As a result of the discrimination at the step S9, if the indoor temperature Tr is bigger than the established temperature Ts (in case of yes), which indicates that the indoor should be cooled, flow advances to step S10, where, a discrimination in made as to whether a predetermined time (a delay time of approximate 5 minutes for protecting a compressor) has lapsed after driving of the indoor fan motor 71 at the step S5, and if the predetermined time has not passed (in case of no), flow returns to the step S5 and drives only fan motor 71 until the predetermined time lapses.

As a result of the discrimination at the step 10, if the predetermined time has lapsed (in case of yes), which implies that there is no problem caused to the compressor 61 even if the compressor 61 is driven because the current is consumed at a steady base, advances to step S11, where, the control means 40 determines an operational frequency of the compressor according to a difference between the indoor temperature Tr and the established temperature Ts, to thereby output a control signal for driving the compressor 61 to compressor driving means 60.

Accordingly, the compressor driving means 60 serves to drive the compressor 61 according to the operational frequency determined by the control means 40.

At this time, at step S12, a determination is made as to whether the indoor airflow discharge amount input by the operation manipulating means 30 is at a low stage, i.e., whether the rotary speed of the indoor fan motor 71 is at a low speed, and if the indoor airflow discharge amount is not at the low stage (in case of no), flow proceeds to step S13, where a discrimination is made as to whether the indoor airflow discharge amount input by the operation manipulating means 30 is at a medium stage, in other words, whether the rotary speed of the indoor fan motor 71 is at an intermediate level.

As a result of the discrimination at the step S13, if the indoor airflow discharge amount is not at the intermediate level (in case of no), flow advances to step S14, where, a determination is made as to whether the indoor airflow discharge amount input by the operation manipulating means 30 is at a high stage, in other words, whether the rotary speed of the indoor fan motor 71 is at a high level.

As a result of the discrimination at the step S14 if the indoor airflow discharge amount is not at the high stage (in case of no), flow returns to the step S3 and performs repeated operations subsequent to the step S3, and if the indoor airflow discharge amount is at the high stage (in case of yes), which implies that the rotary speed of the indoor fan motor 71 is at the high level, flow advances to step S15, where the control means 40 determines the rotary speed of the outdoor fan motor 91 as high level.

Successively, at step S16, a motor driving signal of high level is output to the outdoor fan motor driving means 90 through the output terminal (02) so that the outdoor fan motor 91 can be rotated at a high speed according to the rotary speed of the outdoor fan motor 91 determined by the control means 40.

Accordingly, the outdoor fan motor driving means 90 receives at the inverter INV2 the motor driving signal of high level output from the output terminal 02 of the control means 40 to thereby invert the same to low level and apply the same to the dyristor SS2.

When the dyristor SS2 is rendered conductive, the power source voltage of the commercial AC power source supplied from the AC power source input terminal 1 is applied to the outdoor fan motor 91 to thereby start rotating the outdoor fan motor 91.

When the outdoor fan motor 91 is rotated at the high speed, the signal current changing in the course of high speed rotation of the outdoor fan motor 91 is detected by the second Hall sensor 101 of the outdoor fan speed detecting means 100 to thereby generate a rectangular wave of high level or of low level.

Accordingly, when the rectangular wave output from the second Hall sensor 101 is applied through the resistor R5 to the base terminal of the transistor TR2 to thereby render the transistor to be conductive or non-conductive, a rectangular wave proportionate to the revolution RPM2 of the outdoor fan motor 91 is supplied to the input terminal I2 of the control means 40.

Successively, at step S18, a discrimination is made as to whether the revolution RPM2 of the outdoor fan motor 91 detected by the outdoor fan speed detecting means 100 is the appropriate revolution rpm when the outdoor fan motor 91 is rotated at the high speed.

As a result of the discrimination, if the revolution RPM2 of the outdoor fan motor 91 is not the appropriate revolution rpm (in case of no), flow proceeds to step S181, where the control means 40 controls the motor driving signal of high level or of low level output from the output terminal 02 to thereafter adjust the revoluation RPM2 of the outdoor fan motor 91 to the pre-established appropriate revolution rpm, and the flow returns to the step S17 and performs repeated operations subsequent to the step S17.

Meanwhile, as a result of the discrimination at the step S18, if the revolution RPM2 of the outdoor fan motor 91 is the appropriate revolution rpm (in case of yes), flow advances to step S19, where the indoor temperature Tr changing during the activation of the compressor 61 and the outdoor fan motor 91 is detected by the indoor temperature detecting means 50 to thereby cause the same to be output to the control means 40.

This is to detect the changing indoor temperature Tr because the indoor temperature Tr becomes lowered when the cooling operation is carried out for a predetermined period of time according to drive controls of the compressor 61, outdoor fan motor 91 and the indoor fan motor 71.

Accordingly, at step S20, a discrimination is made as to whether the indoor temperature Tr detected by the indoor temperature detecting means 50 is below the established temperature Ts input by the operation mainpulating means 30, and if the indoor temperature Tr is not below the established temperature Ts (in case of no), flow returns to the step S11 because the cooling operation should be carried out continuously, to thereby perform repeated operations subsequent to the step S11.

As a result of the discrimination at the step S20, if the indoor temperature Tr is below the established temperature Ts (in case of yes), flow proceeds to step S21 because the cooling operation should be stopped, and the control means 40 outputs a control signal to the compressor driving means 60 in order to stop driving of the compressor 61.

Accordingly, the compressor driving means 60 stops the compressor 61 according to the control of the control means 40.

At this time, the control means 40 outputs to the outdoor fan motor driving means 90 through the output terminal 02 the motor driving signal of low level for stopping the drive of the outdoor fan motor 91.

Successively, the outdoor fan motor driving means 90 receives at the inverter INV2 the motor signal of low level output from the output terminal 02 of the control means 40 to thereby invert the same to a high level, so that the same can be applied to the dyristor SS2.

Accordingly, the dyristor SS2 is rendered non-conductive to cut off a power source voltage of the commercial AC power applied to the outdoor fan motor from the AC power source input terminal 1, thereby stopping operation of the outdoor fan motor 91 and terminating the operation.

Meanwhile, as a result of the discrimination at the step S12, if the indoor airflow discharge amount is at the low level (in case of yes), the control means 40 determines at step S22 the rotary speed of the outdoor fan motor 91 as the low speed because the rotary speed of the indoor fan motor 71 is at low level.

Flow now advances to step S16, where a motor driving control signal of high level is output through the output terminal 02 to the outdoor fan motor driving means 90 so that the outdoor fan motor 91 can be rotated at low speed according to the rotary speed determined by the control means 40.

The outdoor fan motor driving means 90 receives at the inverter INV2 the motor driving signal of high level output from the output terminal 02 of the control means 40 to thereby invert the same to low level and to apply the same to the dyristor SS2.

When the dyristor SS2 is rendered conductive, the power source voltage of the commercial AC power source supplied from the AC power source input terminal 1 is applied to the outdoor fan motor 91 to thereby start rotating the outdoor fan motor 91 at the low speed.

The outdoor fan motor driving means 90 now serves to control the outdoor fan motor 91 rotating at the low speed according to the control of the control means 40 and performs repeated operations subsequent to the step S16.

Furthermore, as a result of the discrimination at the step S13, if the indoor airflow discharge amount is at an intermediate level (in case of yes), the control means 40 determines at step S23 the rotary speed of the outdoor fan motor 91 as the intermediate speed because the rotary speed of the indoor fan motor 71 is at the intermediate speed.

Flow now proceeds to the step S16, to thereby output a motor driving signal of high level to the outdoor fan motor driving means 90 through the output terminal 02 so that the outdoor fan motor 91 can be rotated at the intermediate speed according to the rotary speed determined by the control means 40.

Accordingly, the outdoor fan motor driving means 90 receives at the inverter INV2 the motor driving signal of high level output from the output terminal 02 of the control means 40, to thereby invert the same to low level and to apply the same to the dyristor SS2.

Successively, when the dyristor SS2 is rendered conductive, the power source voltage of the commercial AC power source supplied from the AC power source input terminal 1 is applied to the outdoor fan motor 91, to thereby start rotating the outdoor fan motor 91 at the intermediate speed.

Therefore, the outdoor fan motor driving means 90 controls the intermediate rotary speed of the outdoor fan motor 91 according to the control of the control means 40 and peforms the repeated operations subsequent to the step S16.

Meanwhile, although an the embodiment of the present invention has been described, by way of example, in which the outdoor fan motor is variably controlled at multi-levels during the cooling operation of an air conditioner, it should be apparent that the same objects and effects can be accomplished in the heating operation as the cooling operation of the air conditioner.

As apparent from the foregoing, the operational control apparatus of an air conditioner and a method thereof according to the present invention can control rotary speed of an outdoor fan motor according to rotary speed of an indoor fan motor with regard to an indoor airflow discharge amount selected by a user, to thereby provide a pleasant indoor environment and to improve cooling and heating efficiencies.

Having described specific preferred embodiment of the invention with reference to the accompanying drawings, it is to be understood that various changes and modifications may be effected therein by one skilled in the art without departing from the scope or spirit of the invention as defined in the appended claims.

What is claimed is:

1. An operational control apparatus for an air conditioner, the apparatus comprising:

zero voltage detecting means for detecting a zero voltage of an input commercial alternating current;

control means synchronized with the zero voltage of the commercial alternating current detected by the zero voltage detecting means for controlling operation of the air conditioner;

indoor fan motor driving means for receiving a first control signal output from the control means to thereby drive an indoor fan motor according to an indoor airflow discharge amount selected by a user;

indoor fan speed detecting means for detecting a rotary speed of the indoor fan motor so as to discriminate whether or not a revolution rate of the indoor fan motor driven by the indoor fan motor driving means is appropriate based on the indoor airflow discharge amount;

outdoor fan motor driving means for receiving a second control signal output from the control means to thereby drive an outdoor fan motor according to the indoor airflow discharge amount selected by the user so that cooling and heating operations can be performed; and outdoor fan speed detecting means for detecting a rotary speed of the outdoor fan motor so as to discriminate whether or not a revolution rate of the outdoor fan motor driven by the outdoor fan motor driving means is appropriate based on the indoor airflow discharge amount.

2. An operational control apparatus for an air conditioner as defined in claim 1, wherein the indoor fan motor driving means comprises:

an inverter for inverting the first control signal output from the control means;

a dyristor which receives the first control signal inverted by the inverter and which is turned on or turned off to thereby control a current of the input commercial alternating current applied to the indoor fan motor to thereby cause the indoor fan motor to be driven; and a capacitor connected in parallel to the indoor fan motor which capacitor is charged or discharged to form a voltage source for driving the indoor fan motor.

3. An operational control apparatus for an air conditioner as defined in claim 1, wherein the indoor fan speed detecting means comprises:

a Hall sensor for detecting a signal current which changes when the indoor fan motor rotates so that a revolution rate of the indoor fan motor driven by the indoor fan motor driving means is detected;

a first capacitor connected in parallel to the Hall sensor for filtering a noise component contained in the signal current detected by the Hall sensor;

a transistor which is turned on or turned off by receiving the signal current detected by the Hall sensor to output a pulse signal to the control means;

a first resistor connected between the Hall sensor and a base of the transistor;

second and third resistors connected to a collector of the transistor so that the pulse signal proportionate to the revolution of the indoor fan motor during activation or deactivation of the transistor is output to the control means;

a second capacitor connected to the third resistor for filtering a noise component contained in the pulse signal generated during the activation and deactivation of the transistor; and a fourth resistor connected across the collector and the base of the transistor through the first and second resistors so that current flowing in the base of the transistor is steadily maintained.

4. An operational control apparatus for an air conditioner as defined in claim 1, wherein the outdoor fan motor driving means comprises:

an inverter for inverting the second control signal output from the control means;

a dyristor which receives the second control signal inverted by the inverter and which is turned on or turned off to thereby control a current of the input commercial alternating current applied to the outdoor fan motor; and a capacitor which is charged or discharged during activation or deactivation of the dyristor to thereby form a voltage source for driving the outdoor fan motor.

5. An operational control apparatus for an air conditioner as defined in claim 1, wherein the outdoor fan speed detecting means comprises:

a Hall sensor for sensing a signal current which changes in the course of rotation of the outdoor fan motor so that a revolution rate of the outdoor fan motor driven by the outdoor fan motor driving means is detected;

a first capacitor for filtering a noise component contained in the signal current detected by the Hall sensor;

a transistor which is turned on or turned off by receiving the signal current detected by the Hall sensor to thereby output a pulse signal to the control means;

a first resistor connected between the Hall sensor and a base of the transistor;

second and third resistors connected to a collector of the transistor so that the pulse signal proportionate to the revolution of the outdoor fan motor when the transistor is turned on or turned off is output to the control means;

a second capacitor for filtering a noise component contained in the pulse signal generated in the activation or deactivation of the transistor; and a fourth resistor connected to the collector and the base of the transistor through the first and second resistors so that current flowing in the base of the transistor is steadily maintained.

6. An operational control method for an air conditioner, the method comprising the steps of:

detecting a rotary speed of an indoor fan motor and comparing the rotary speed of the indoor fan motor to an indoor airflow discharge amount selected by a user to thereby discriminate whether or not the rotary speed of the indoor fan motor is an appropriate rotary speed;

determining whether to operate an outdoor fan motor based on an established temperature and an indoor temperature when the rotary speed of the indoor fan motor detected by the indoor fan speed detecting step is the appropriate rotary speed;

determining an appropriate rotary speed of the outdoor fan motor based on the indoor airflow discharge amount selected by the user when the outdoor fan motor is operating;

driving the outdoor fan motor according to the appropriate rotary speed determined by the outdoor fan speed determining step and detecting the rotary speed of the outdoor fan motor;

discriminating whether the rotary speed of the outdoor fan motor detected by the outdoor fan speed detecting step is the appropriate rotary speed determined by the outdoor fan speed determining step; and driving a compressor and the outdoor fan motor with a control means to thereby perform cooling and heating operations when the rotary speed of the outdoor fan motor detected by the outdoor fan speed detecting step is the appropriate rotary speed.

7. An operational control method for an air conditioner as defined in claim 6, wherein in the outdoor fan speed determining step the appropriate rotary speed of the outdoor fan motor is set as a low speed when the indoor airflow discharge amount selected by the user is at a low level.

8. An operational control method for an air conditioner as defined in claim 6, wherein in the outdoor fan speed determining step the appropriate rotary speed of the outdoor fan motor is set as an intermediate speed when the indoor airflow discharge amount selected by the user is at an intermediate level.

9. An operational control method for an air conditioner as defined in claim 6, wherein in the outdoor fan speed determining step the appropriate rotary speed of the outdoor fan motor is set as a high speed when the indoor airflow discharge amount selected by the user is at a high level.

10. An operational control method for an air conditioner as defined in claim 6, further comprising the step of increasing or decreasing the rotary speed of the outdoor fan motor according to control of the control means when the rotary speed of the outdoor fan motor detected in the outdoor fan speed detecting step is not the appropriate rotary speed determined in the outdoor fan speed determining step.

11. A method for controlling an air conditioner, comprising the steps of:

setting a target air flow rate and a target temperature;

driving an indoor fan at a speed based on the target air flow rate;

determining whether to drive an outdoor fan based on an indoor temperature and the target temperature;

driving the outdoor fan at a speed based on the speed of the indoor fan;

driving a compressor at a speed based on the indoor temperature and the target temperature.

* * * * *